United States Patent [19]

Janotta

[11] Patent Number: 4,807,464
[45] Date of Patent: Feb. 28, 1989

[54] LEAK DETECTOR APPARATUS AND METHOD

[76] Inventor: Louis J. Janotta, 7940 Teton Rd., Orland Park, Ill. 60462

[21] Appl. No.: 74,632

[22] Filed: Jul. 17, 1987

[51] Int. Cl.$^4$ .............................................. G01M 3/32
[52] U.S. Cl. ......................................... 73/49.2; 73/302
[58] Field of Search ............................ 73/49.2 T, 302

[56] References Cited

U.S. PATENT DOCUMENTS

| 3,580,055 | 5/1971 | White | 73/49.2 |
| 4,386,525 | 6/1983 | Mooney | 73/49.2 |
| 4,474,054 | 10/1984 | Ainlay | 73/49.2 |

FOREIGN PATENT DOCUMENTS

| 2511268 | 9/1975 | Fed. Rep. of Germany | 73/49.2 |
| 247132 | 12/1985 | Japan | 73/49.2 |
| 1006921 | 3/1983 | U.S.S.R. | 73/302 |

Primary Examiner—Stewart J. Levy
Assistant Examiner—Joseph W. Roskos
Attorney, Agent, or Firm—Frank J. Uxa

[57] ABSTRACT

An apparatus useful for detecting a leak in a tank filled with liquid comprising:

a measuring chamber adapted to hold a volume of liquid and having first sensing acting to monitor the volume of liquid in the measuring chamber;

a level control chamber in fluid communication with the measuring chamber and the tank, and adapted to maintain a substantially constant liquid head on the tank, the level control chamber including inlet adapted to receive liquid from the measuring chamber to maintain the substantially constant liquid head and outlet adapted so that liquid flows from the level control chamber; and a catch chamber in fluid communication with the level control chamber and adapted to receive the liquid from the outlet, the catch chamber having second sensing acting to monitor the volume of liquid in the catch chamber.

24 Claims, 1 Drawing Sheet

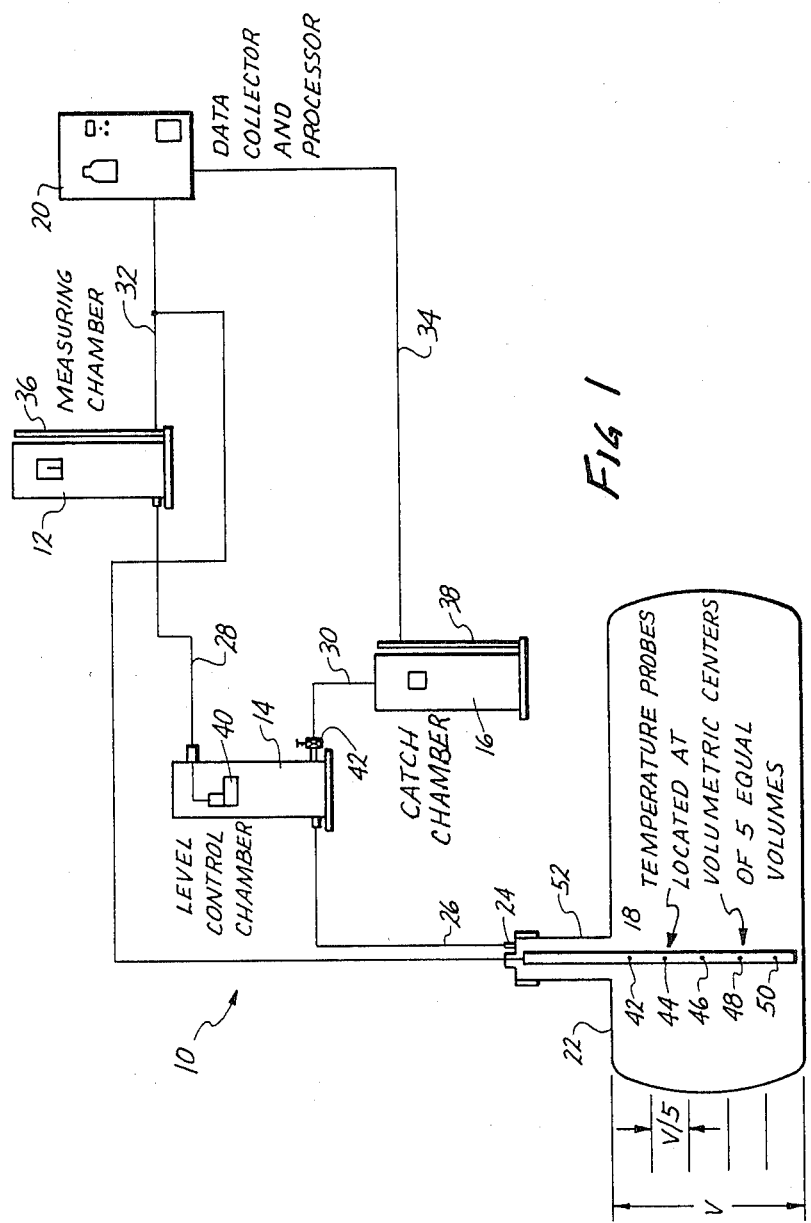

LEAK DETECTOR APPARATUS AND METHOD

BACKGROUND OF THE INVENTION

This invention relates to the art of detecting leaks. More particularly, this invention relates to detecting volume leaks in liquid storage tanks.

Detecting small losses of liquid from a storage tank, e.g., an underground gasoline storage tank, can be very difficult. Many systems and methods have been suggested to detect such leaks. For example, Sunmark Industries, a division of Sun Oil Company of Pennsylvania, has sold a leak detecting device which relies on the principle of buoyancy, i.e., the principle that a body suspended in a liquid is buoyed up by a force equal to the weight of liquid displaced by such a body. A sensor which extends from a balance and which is partially submerged in the tank fluid detects buoyancy changes corresponding to either an increase or a decrease in the total amount of liquid in a tank.

The Kent-Moore System, see U.S. Pat. No. 3,580,055, is a method and apparatus for determining whether there are any leaks in a liquid storage container. One of the steps necessary in carrying out a determination of leaks is to fill to excess a storage zone and manually maintain a constant head on the tank. The liquid in the tank is circulated to maintain an average temperature within the tank.

There are several problems in the Kent-Moore System which result in readings which are not stable. One source of these problems involves gas bubbles which become trapped within a storage tank or zone. Since most storage tanks are not absolutely level, vapor pockets almost inevitably form as such a tank is filled to excess. Trapped gas bubbles tend to change in volume in response to changes in temperature and/or changes in pressure. Maintaining the head on the tank manually as in the Kent-Moore test can cause significant variations in pressure. During testing with the Kent-Moore System, it has been found that observed volumes often fluctuate in both a positive and negative direction. These fluctuations are believed to result from changes in sizes of trapped gas bubbles.

Another source of problems arises because the Kent-Moore System uses a pump that necessarily inputs energy into the tank. As a result of using such a pump, temperature equilibration is very difficult to achieve.

Clearly, apparatus and methods capable of easily

SUMMARY OF THE INVENTION

A new system for detecting a leak in a tank has been discovered. In a broad aspect, the present invention comprises an apparatus useful for detecting a leak in a tank filled with liquid and comprises a measuring chamber, a level control chamber and a catch chamber.

The measuring chamber is adapted to hold a volume of liquid and has a first sensing means or sub-system acting to sense or monitor the volume of liquid therein. The level control chamber is in fluid communication, preferably controlled fluid communication, with the measuring chamber and in fluid communication with the tank. The level control chamber is adapted to maintain, preferably, automatically maintain, a substantially constant liquid head on the tank. The level control chamber includes an inlet adapted to receive liquid from the measuring chamber, as needed, to maintain the liquid head on the tank, and an outlet adapted so that liquid flows from the liquid control chamber. The catch chamber is in fluid communication with the level control chamber and is adapted to receive liquid from the outlet of the level control chamber. The catch chamber also has a second sensing means acting to monitor or sense the volume of liquid in the catch chamber. Preferably, the present apparatus further comprises one or more temperature monitors or sensors adapted to sense the temperature of the liquid in the tank, more preferably at a plurality of different points in the tank.

In another broad aspect, the invention involves a method for detecting a leak in a tank filled with liquid. This the present apparatus.

This method typically comprises providing a chamber, e.g., the present level control chamber, in fluid communication with a liquid filled tank such that the tank includes a substantially constant level of liquid and the tank is under a substantially constant head of liquid. A volume of liquid is withdrawn from the chamber over a given period of time, preferably at a substantially constant flowrate. Liquid is added to the chamber, as needed, to maintain, preferably automatically maintain, a substantially constant level of liquid therein. The volume of liquid withdrawn from and the volume of liquid added to the chamber over a given period of time are determined. The relationship of the volume of liquid withdrawn from the chamber to the volume of liquid added to the chamber is used to detect the presence of a leak in the tank. Preferably, the effect of the temperature change, if any, in the tank on the specific gravity or density of the liquid in the tank is factored in prior to making a determination as to whether a tank leak exists.

The present system provides substantial advantages. For example, the present system maintains, preferably automatically maintains, a substantially constant pressure, i.e., head of liquid, on the tank. Thus, pressure inside the tank is substantially constant and any vapor pockets in the tank are not affected by pressure variations. Also, the preferred automatic feature allows for more precise control of the liquid head, for example, relative to the Kent-Moore system in which the liquid head is controlled manually. In addition, since the present system does not require that the liquid in the tank be pumped or circulated, this liquid is more quiescent relative to the Kent-Moore system. This allows for accurately determining the presence of very small tank leaks. The present system, in short, is relatively simple to operate, can be operated substantially automatically, i.e., without direct human intrusion or interference, and provides accurate and reliable leak detections.

The first and second sensing means referred to above may be any gauge, meter or other device conventionally used to monitor or sense the volume (or level from which the volume can be obtained) of liquid in the measuring chamber and the catch chamber, respectively. One particularly useful embodiment of first and second sensing means includes the indicators, especially the magnetic reed switches/magnetic float combination, described in U.S. Pat. No. 4,275,382, which patent is hereby incorporated in its entirety by reference herein. Such indicators are included in a tank gauge system sold by L & J Engineering, Inc. under the trademark MCG-1000.

The apparatus is preferably structured so that liquid can flow by gravity from the measuring chamber to the level control chamber, and from the level control chamber to the catch chamber. Of course, the level control chamber should be at least partially above, preferably substantially totally above, the top of the tank. In this embodiment, substantially no other pumping or pumping action is required.

The measuring chamber preferably includes an outlet which provides fluid communication between the measuring chamber and the level control chamber to provide liquid to the level control chamber, as needed.

The level control chamber is preferably structured so that liquid from the chamber is continually released into the catch chamber at a predetermined, more preferably substantially constant, flowrate. If the liquid level in the level control chamber decreases, i.e., is lowered, a level control mechanism, for example, a suitably structured, conventional float assembly, in the level control chamber is activated to open the outlet from the measuring chamber. This allows liquid to enter the level control chamber from the measuring chamber to maintain the liquid level in the level control chamber at a predetermined height. If the liquid level exceeds this predetermined height, the float assembly acts to close or keep closed the passageway between the measuring chamber and the level control chamber.

The flowrate of liquid from the level control chamber to the catch chamber is preferably substantially constant during the period of time the test is conducted. This flowrate is preferably manually set, e.g., by manually controlling a valve in the line between the level control chamber and the catch chamber. If, as is preferred, the effect of temperature of the liquid in the tank is to be compensated for, the flowrate can be set based on liquid tank temperature measurements taken prior to the test period.

Liquid tank temperature may be measured using any one or more of various conventional temperature sensors, such as thermometers, thermocouples, thermistors and the like. As noted above, it is preferred to measure the temperature at a plurality of points, e.g., depths, in the tank.

A particularly useful system for measuring the temperature of liquid in a tank involves a plurality of temperature sensors spaced apart, e.g., in a temperature probe, such that each sensor senses the average temperature of a predetermined, preferably substantially equal, volume fraction of the liquid in the tank. The average liquid temperature is obtained by summing the volume weighted temperature measured b each of the temperature sensors. For example, temperatures may be measured using five (5) thermistors located at the volumetric centers of five (5) equal volumes within the tank. The average temperature of the liquid in the tank is equal to the sum of 20% of each individual temperature sensed. This provides an effective, relatively simple, and accurate approach to obtaining liquid temperature.

The measured change in the temperature prior to the test period may be used to determine the liquid flowrate between the level control chamber and the catch chamber. The measured change in the temperature during the period of the test is used in compensating for liquid specific gravity or density changes in the tank. The coefficient of thermal expansion of the liquid is determined, for example, using the specific gravity measured by a hydrometer and adjusted to 15.6° C.

The present system preferably further comprises a data collector, i.e., a data means, acting to collect data from the first and second sensing means, and more preferably from the temperature means as well. In one embodiment, a data means is provided acting, preferably automatically acting, to collect temperature data from the temperature sensors and to process, preferably automatically process, the collected temperature data to determine the average temperature of the liquid in the tank. In a particularly useful embodiment, the data means further acts to process these data which are useful in determining whether the tank has a leak. Preferably, the data means performs its function or functions automatically, and more preferably is in electronic communication with the first and second sensing means and with the temperature means. The data means may be a microprocessor-based data acquisition, data processing system. This system can be programmed to collect the various data prior to and during the test period, process these data and analyze these data to determine whether the tank has a leak. The various mathematical relationships that can be programmed into this data system are discussed elsewhere herein. One especially useful data acquisition/data processing system useful in the present invention is sold by L & J Engineering, Inc. under the trademark MCG-1100.

Preferably, the liquid in the tank and the liquid in the measuring chamber, the level control chamber and the catch chamber have substantially the same composition.

These and other aspects and advantages of the present invention are set forth in the following detailed description and claims, particularly when considered in conjunction with the accompanying drawing in which like parts bear like reference numerals.

BRIEF DESCRIPTION OF THE DRAWING

FIG. 1 is a schematic illustration showing an embodiment of the present leak detector system in place and ready for use.

DETAILED DESCRIPTION OF THE DRAWING

Referring now to FIG. 1, a leak detector, shown generally at 10, in accordance with the present invention includes a measuring chamber 12, a level control chamber 14, a catch chamber 16, a temperature probe sheath 18, and a data collector and processor 20. Leak detector 10 is shown ready for use in conjunction with under ground liquid storage tank 22.

Level control chamber 14 is attached directly to i.e., in fluid communication with, tank 22 by a fill tube extension 24 and line 26 so that liquid, e.g., gasoline, may be added to tank 22 to a level above grade. Both measuring chamber 12 and catch chamber 16 are connected by tubing segments 28 and 30, respectively to level control chamber 14 and electronically to data collector and processor 20 by lines 32 and 34, respectively. Data collector and processor 20 preferably is the MCG 1100 electronics box sold by L & J Engineering, Inc. Individual liquid level gauges 36 and 38 are included as parts of measuring chamber 12 and catch chamber 16, respectively, and sense or gauge the level of liquid in measuring chamber 12 and catch chamber 16, respectively. Such gauges are each preferably a gauge assembly sold by L & J Engineering, Inc. under trademark MCG 1000. Gauges 36 and 38 are directly electronically linked to data collector and processor 20 by lines 32 and 34, respectively.

Level control chamber 14 is set up so that liquid is continually released into catch chamber 16 at a predetermined, substantially constant rate. If the liquid level in level control chamber 14 decreases, a conventional float assembly 40 in the level control chamber 14 opens the end of tubing segment 28 allowing liquid to enter level control chamber 14 from measuring chamber 12.

A needle valve 42 is manually set to a predetermined, substantially constant flow rate, allowing liquid to flow from level control chamber 14 to catch chamber 16 prior to the test period. The flow rate to catch chamber 16 is determined with the aid of temperature measurements taken inside tank 22 prior to the period.

Included within temperature probe sheath 18 are five (5) conventional thermistors 42, 44, 46, 48, and 50 which sense the temperature of the liquid in tank 22. These thermistors are placed vertically in tank 22 at the center of five equal volumes of tank 22. Signals representing the temperatures sensed by thermistors 42, 44, 46, 48 and 50 are communicated or transmitted to data collector and processor 20 which processes these temperature signals, as described herein, to determine the volume weighted average temperature of the liquid in tank 22 and to facilitate determining whether tank 2 is leaking.

Leak detector 10 functions as follows. Tank 22 is filled with liquid, e.g., gasoline, up to the base of the fill tube 52 a minimum of two (2) hours prior to testing. The liquid level in tank 22 is brought above grade in two stages. In the first stage, tank 22 is filled to about 15 inches above grade. Liquid level is then observed to assure that tank 22 has been stabilized. Tank 22 may be considered stabilized if the level does not drop below about 10 inches above grade in the ensuing 30 minute period. If it does, the liquid level is again raised to about 15 inches above grade and monitored. This step is repeated until the level remains about 10 inches above grade for a period of 15 minutes.

In the second stage, the liquid level is brought to a level of about 48 inches above grade and is monitored for a minimum of one (1) hour. If the level drops below about 43 inches above grade, liquid is added to tank 22 to bring the level back to 48 inches above grade. To complete the second stage, the change in volume for each of three consecutive 15 minute periods must be less than a given criterion, e.g., less than about 0.01 gallon. Additional waiting periods in increments of 15 minutes may ensue until such time as the change-in-volume criterion has been satisfied. (If this change-in-volume criterion cannot reasonably be achieved, this fact itself is substantial evidence that tank 22 has a leak.) Once the second stage is completed, normally within one (1) to three (3) hours from the start of the first stage, the liquid level in tank 22 is brought to about 24 inches above grade. A 15 to 30 minute wait ensues, and then the test may commence.

Liquid temperature measurements in tank 22 and liquid level measurements in measuring chamber 12 and catch chamber 16 are made at the beginning and end of the one (1) hour test. Each measurement involves five (5) separate determinations averaged over a two (2) second period by data collector and processor 20.

Liquid volume changes in each of the measuring chamber 12 and the catch chamber 16 are easily determined by multiplying the cross-sectional area of each of these vessels by the observed liquid level change. The temperature measurements, combined with the known specific gravity and coefficient of thermal expansion of the liquid in the tank 22 and the known nominal volume of tank 22, can be used to easily calculate the changes in the effective volume of tank 22 over the period. By "effective volume" of tank 22 is meant the volume of tank 22 which would be needed to hold a given amount of liquid, e.g., the amount of liquid present in tank 22 at the beginning of the test, at the conditions present in tank 22 at the end of the test period.

The liquid in tank 22, measuring chamber 12, level control chamber 14 and catch chamber 16 all has substantially the same composition.

The leak rate, if any, in tank 22 is the change in volume measured in catch chamber 16 plus the change in effective volume of tank 22 due to thermal effects subtracted from the change in volume measured in measuring chamber 12. The calculation is shown in Table 1. Data collector and processor 20 is supplied with the correlations noted above. Data collector and processor 20 collects the various data, processes such data, and presents, e.g., via a tape print out or a video display, processed data useful in determining whether tank 22 has a leak. Data collector and processor 20 can be programmed with sufficient information to provide a conclusion as to whether or not tank 2 is leaking.

TABLE 1

$$LR = (dV - VB - dTV)/dt$$

where
  LR = Leak Rate in volume per hour
  dTV = Effective volume change of tank 22 due to change
    in liquid temperature (over the one (1) hour test period).
  VB = Volume change accumulated in graduated cylinder 16 (over the one (1) hour test period).
  dV = Volume change measured in measuring chamber 12 (over the one (1) hour test period).
  dt = Length of test (1 hour)

The specific test conditions, illustrated in particular with regard to times, distances above grade, change-in-volume criteria and the like, are not critical to the present invention. Such test conditions may be varied depending, for example, on the particular application involved.

The present system is very effective and reliable in detecting liquid leaks in tanks. The leak detection is preferably performed substantially automatically so that human subjectivity in analyzing the test results is reduced or eliminated. During the test period the liquid in the tank is maintained substantially still or quiescent. This reduces, or eliminates, the production and/or alteration (change) of vapor pockets (bubbles) in the tank which might result from pumping or other liquid movement, e.g., in an attempt to maintain a constant, substantially uniform liquid temperature in the tank. Also, a substantially constant liquid head is preferably automatically maintained on the tank, thereby aiding in maintaining the conditions in the tank during the test period. These and other features of the present apparatus and method help provide effective and reliable leak detection.

While the invention has been described with respect to various specific examples and embodiments, it is to be understood that the invention is not limited thereto and that it can be variously practiced within the scope of the following claims.

The embodiments of the present invention in which an exclusive property or privilege is claimed are as follows:

1. An apparatus useful for detecting a leak in a tank filled with liquid comprising:
  measuring chamber means adapted to hold a volume of liquid and having first sensing means acting to monitor the volume of liquid in said measuring chamber means;

level control chamber means in fluid communication with said measuring chamber means and said tank, and adapted to maintain a substantially constant liquid head on said tank, said level control chamber means including inlet means adapted to receive liquid from said measuring chamber means to maintain said substantially constant liquid head and outlet means adapted so that liquid flows from said level control chamber means; and catch chamber means in fluid communication with said level control chamber means and adapted to receive said liquid from said outlet means, said catch chamber means having second sensing means acting to monitor the volume of liquid in said catch chamber means.

2. The apparatus of claim 1 which further comprises temperature means adapted to sense the temperature of the liquid in said tank, and said level control chamber means is adapted to automatically maintain a substantially constant liquid head on said tank.

3. The apparatus of claim 2 wherein said temperature means is adapted to sense the temperature of the liquid in said tank at a plurality of points.

4. The apparatus of claim 3 which further comprises data means acting to collect data from said first and second sensing means and said temperature means.

5. The apparatus of claim 3 wherein said temperature means includes a plurality of temperature sensors spaced apart such that each temperature sensor senses the average temperature of a predetermined volume fraction of the liquid in said tank.

6. The apparatus of claim 5 wherein each of said predetermined volume fractions is substantially equal.

7. The apparatus of claim 6 which further comprises means acting to collect temperature data from said temperature sensors and to process said collected temperature data to determine the average temperature of said liquid in said tank.

8. The apparatus of claim 5 which further comprises means acting to collect temperature data from said temperature sensors and to process said collected temperature data to determine the average temperature of said liquid in said tank.

9. The apparatus of claim 2 wherein said means is adapted to process said collected data and present processed data useful in determining whether said tank has a leak.

10. The apparatus of claim 9 wherein said means is in electronic communication with said first and second sensing means and said temperature means.

11. The apparatus of claim 1 wherein said outlet means is adapted so that liquid from said level control chamber means flows through said outlet means at a substantially constant flowrate.

12. The apparatus of claim 11 wherein said outlet means includes a manually controlled valve.

13. The apparatus of claim 1 which further comprises means acting to collect data from said first and second sensing means.

14. The apparatus of claim 13 wherein said data means is adapted to process said collected data and present processed data useful in determining whether said tank has a leak.

15. A method for detecting a leak in a tank filled with liquid comprising:

providing a chamber in fluid communication with said tank such that said chamber includes a substantially constant level of liquid and said tank is under a substantially constant head of liquid;

withdrawing a volume of liquid from said chamber over a period of time;

adding liquid to said chamber as needed to maintain said substantially constant level of liquid therein; and determining the volumes of liquid withdrawn and added to said chamber over a given period of time, the relationship of the volume withdrawn from said chamber to the volume of liquid added over said given period of time being used to detect the presence of a leak in said tank.

16. The method of claim 15 which further comprises adjusting the volume of liquid withdrawn and the volume of liquid added to said chamber for the temperature of liquid in said tank prior to using said relationship and said substantially constant head of liquid is automatically maintained on said tank.

17. The method of claim 16 which further comprises determining the temperature of the liquid in said tank at a plurality of locations in said tank.

18. The process of claim 16 which further comprises processing said volume determinations to derive said relationship.

19. The method of claim 18 wherein said processing occurs electronically.

20. The method of claim 15 wherein said liquid is withdrawn from said chamber at a substantially constant rate.

21. The process of claim 20 wherein the rate at which liquid is withdrawn from said chamber is adjustable.

22. The method of claim 15 wherein the composition of liquid in said tank, in said chamber, withdrawn from said chamber and added to said chamber is substantially the same.

23. The method of claim 15 which further comprises processing said volume determinations to derive said relationship.

24. The process of claim 15 wherein the rate at which liquid is withdrawn from said chamber is adjustable.

* * * * *

UNITED STATES PATENT AND TRADEMARK OFFICE
CERTIFICATE OF CORRECTION

PATENT NO. : 4,807,464
DATED : February 28, 1989
INVENTOR(S) : Louis J. Jannotta It is certified that error appears in the above-identified patent and that said Letters Patent is hereby corrected as shown below:

ON THE TITLE PAGE:

[76] Inventor: delete "Janotta" and insert in place thereof -- Jannotta --

Column 7, line 29; delete "data" (first occurrence)

Column 8, line 8; delete "data"

Signed and Sealed this

Twenty-ninth Day of August, 1989

Attest:

DONALD J. QUIGG

*Attesting Officer*     *Commissioner of Patents and Trademarks*